US011312368B2

United States Patent
Schuler

(10) Patent No.: US 11,312,368 B2
(45) Date of Patent: Apr. 26, 2022

(54) ONBOARD AUTOMATIC PARKING SYSTEM FOR A VEHICLE

(71) Applicant: VALEO COMFORT AND DRIVING ASSISTANCE, Créteil (FR)

(72) Inventor: Stephane Schuler, Shenzhen (CN)

(73) Assignee: VALEO COMFORT AND DRIVING ASSISTANCE, Créteil (FR)

( * ) Notice: Subject to any disclaimer, the term of this patent is extended or adjusted under 35 U.S.C. 154(b) by 19 days.

(21) Appl. No.: 15/972,563

(22) Filed: May 7, 2018

(65) Prior Publication Data

US 2018/0326975 A1 Nov. 15, 2018

(30) Foreign Application Priority Data

May 9, 2017 (CN) .......................... 201710320572.1

(51) Int. Cl.
*B60Q 1/02* (2006.01)
*B60W 30/06* (2006.01)
*E04H 6/18* (2006.01)
*G08G 1/133* (2006.01)
*G08G 1/14* (2006.01)
*E05F 15/77* (2015.01)
*G07C 9/00* (2020.01)

(52) U.S. Cl.
CPC .............. *B60W 30/06* (2013.01); *E05F 15/77* (2015.01); *G07C 9/00174* (2013.01); *B60W 2710/12* (2013.01); *B60W 2710/18* (2013.01); *B60W 2710/20* (2013.01); *G07C 2009/00769* (2013.01); *G07C 2009/00928* (2013.01)

(58) Field of Classification Search
None
See application file for complete search history.

(56) References Cited

U.S. PATENT DOCUMENTS

| 2014/0320263 | A1  | 10/2014 | Fan et al. | |
| 2016/0375898 | A1* | 12/2016 | Breuel | G08G 1/149 |
| | | | | 340/932.2 |
| 2017/0008490 | A1* | 1/2017 | Sako | B60R 25/25 |
| 2017/0113619 | A1* | 4/2017 | Boehm | G07C 9/00309 |

(Continued)

OTHER PUBLICATIONS

Wikipedia, Garage door opener, Apr. 9, 2016, provided by https://en.wikipedia.org/w/index.php?title=Garage_door_opener&oldid=714456136 on Apr. 22, 2019. (Year: 2016).*

(Continued)

*Primary Examiner* — Adam D Tissot
*Assistant Examiner* — Laura E Linhardt
(74) *Attorney, Agent, or Firm* — Osha Bergman Watanabe & Burton LLP

(57) ABSTRACT

An onboard automatic parking system for a vehicle comprises:
  an automatic parking unit (20) suited to control a maneuver of the vehicle in or out of a park area secured by a remotely controlled access system;
  a communication circuit (14) suited to send a wireless instruction for operating the access system; and
  a human machine interface (30) suited to monitor the communication circuit (14) to send the wireless instruction upon actuation of the human machine interface (30), wherein the human machine interface (30) is also suited to command the automatic parking unit (20) that controls the maneuver subsequent to actuation of said human machine interface (30).

9 Claims, 1 Drawing Sheet

(56) References Cited

U.S. PATENT DOCUMENTS

2017/0211287 A1* 7/2017 Schmitt ................ E04H 6/18
2017/0219362 A1* 8/2017 Bryson ............... G01C 21/206
2017/0334380 A1* 11/2017 Bonnet .................. B60Q 1/02
2018/0281858 A1* 10/2018 Griffith ................ B60W 30/06
2018/0374291 A1* 12/2018 Schuler ............. G07C 9/00309

OTHER PUBLICATIONS

The Third Office Action issued in Chinese Application No. 201710320572.1, dated Dec. 2, 2021 (12 pages).

* cited by examiner

ONBOARD AUTOMATIC PARKING SYSTEM FOR A VEHICLE

TECHNICAL FIELD OF THE INVENTION

The invention relates to vehicles having an automatic maneuver capability and more precisely to an onboard automatic parking system for a vehicle.

BACKGROUND INFORMATION AND PRIOR ART

It is known to provide vehicles with an automatic parking capability such that the vehicle may park without receiving any direction from the driver. Such a vehicle may have for instance an onboard system including an automatic parking unit suited to control a maneuver of the vehicle in or out of a garage.

Besides, in many regions around the world, it is quite common to possess a garage that is accessible through a remote controlled door. A remote control device is usually provided to trigger the opening of a garage door or a gate. Such access systems are generally known as GDO (for "Garage Door Opener") and the devices remotely controlling them UGDO (for "Universal Garage Door Opener").

SUMMARY OF THE INVENTION

In this context, the invention provides an onboard system for a vehicle comprising an automatic parking unit suited to control a maneuver of the vehicle in or out of a park area secured by a remotely controlled access system; a communication circuit suited to send a wireless instruction for operating the access system; and a human machine interface (HMI) suited to monitor the communication circuit to send the wireless instruction upon actuation of the human machine interface, wherein the human machine interface is also suited to command the automatic parking unit that controls the maneuver subsequent to actuation of said human machine interface.

It is thus possible for the user to control the automatic parking maneuver and the park area access system using the same human machine interface.

For clarity, the access system may be for instance a garage door, a gate, a barrier or a lift, that needs to be operated while maneuvering the car.

The following optional (and thus not exhaustive) features are also proposed:
- the communication circuit is suited to establish a wireless data link with a mechanism for operating the access system;
- the communication circuit is suited to transmit said wireless instruction via said wireless data link;
- the communication circuit is suited to transmit the wireless instruction by generating a sub GHz radiofrequency signal;
- the vehicle includes a button suited to send a given instruction via a bus to the communication circuit;
- the communication circuit generates said radiofrequency signal upon receiving the given instruction;
- the human machine interface is connected to said bus and suited to send the given instruction on said bus upon actuation of the human machine interface;
- said human machine interface is a button suited to send a given instruction via a bus to the communication circuit (the communication circuit generating said radiofrequency signal upon receiving the given instruction);
- the automatic parking unit is suited to control the maneuver upon receiving the given instruction on the bus;
- the automatic parking unit includes at least one sensor for acquiring data relating to the vehicle environment;
- the automatic parking unit includes a processing circuit for processing data acquired by the sensor;
- the automatic parking unit includes a control circuit for controlling a vehicle motion control mechanism based on the processed data.

Other features and advantages of the embodiments of the present invention will be better understood upon reading of preferred embodiments thereof with reference to the appended drawings.

DETAILED DESCRIPTION OF EXAMPLE(S)

Figure 1:
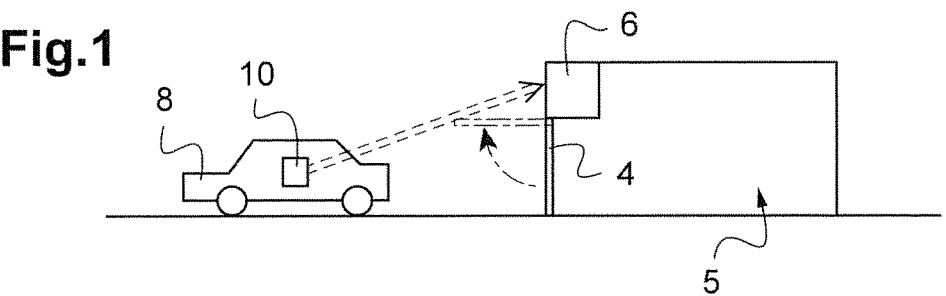
FIG. 1 shows a possible context of implementation of the invention.

FIG. 1 shows a possible context in which the invention may be used. The invention is however not limited to this possible context.

In this context, a vehicle 8 is about to enter a park area 5 (here a garage) secured by an access system 4 (here a garage door).

A mechanism 6; 106; 206 for operating (e.g. opening or closing) the access system 4 (here for opening or closing the garage door) can be remotely controlled, i.e. activated when receiving a wireless instruction with valid credentials.

The vehicle 8 is equipped with an automatic parking unit 20; 120; 220 suited to maneuver the vehicle 8 into the park area 5 after a pre-defined user action is detected on a human machine interface (HMI) 30; 130; 230.

The same human machine interface 30; 130; 230 is suited to command a communication circuit 14; 114; 214 to send the above-mentioned wireless instruction upon actuation of an element 34; 134; 234 of the human machine interface 30; 130; 230, thereby triggering operation (e.g. opening) of the access system 4.

As already mentioned, the access system 4 is here a garage door. According to a possible variation, the access system 4 could be an elevator making it possible for the vehicle to access the park area.

In addition, in another possible context, the communication circuit 14; 114; 214 could also send a wireless instruction to control a comfort equipment (e.g. a garage lighting) associated with the access system (or, in another embodiment, independent of the access system).

Figure 2:
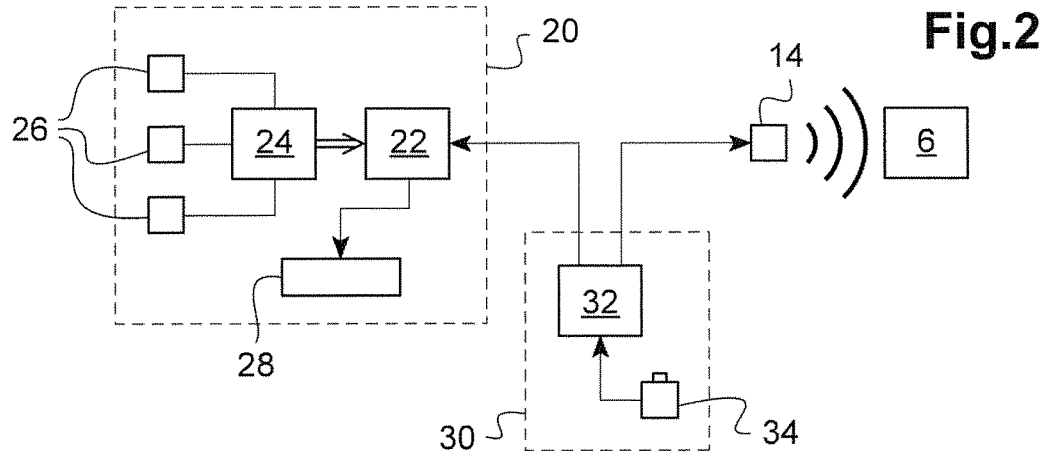
FIG. 2 shows a first embodiment of an onboard system according to the invention.

According to a first embodiment schematically represented in FIG. 2, the vehicle onboard system 10 comprises the automatic parking unit 20, the human machine interface 30 and a data communication circuit 14.

The data communication circuit 14 is suited to establish a wireless data link with the mechanism 6 for operating (opening) the access system 4. In practice, this wireless data link is for instance a Bluetooth data link or a data link in a wireless local area network (WLAN).

The human machine interface 30 comprises a control unit 32 and an HMI element 34. The HMI element 34 is here a (push) button. As a variation, this element could be another type of mechanical knob, or a virtual button on a touchscreen, or a voice or gesture command.

Upon actuation of this element 34 by the user, an actuation signal is received at the control unit 32, which then commands the automatic parking unit 20 to perform an automatic maneuver into the park area 5 and the data communication circuit 14 to send the wireless instruction to the mechanism 6 via the established wireless data link.

Precisely, the control unit 32 of the human machine interface 30 sends a request to a control unit 22 of the automatic parking unit 20 to start the automatic parking procedure. Further operation of the automatic parking unit 20 is described below.

In parallel, as the wireless instruction is transmitted to the mechanism 6, the mechanism operates (e.g. opens) the access system 4 (here the garage door), which enables the vehicle 8 to maneuver into the park area 5.

According to a possible implementation, transmission of the wireless instruction by the data communication circuit 14 is synchronized with the maneuver. In this goal, the automatic parking unit 20 may for instance be suited to compute an appropriate time to operate the access system 4 (possibly taking into account the time needed to operate the access system) and to communicate said appropriate time to (the control unit 32 of) the human machine interface 30 such that (the control unit 32 of) the human machine interface 30 may control operation of the access system 4 at said appropriate time.

Figure 3:
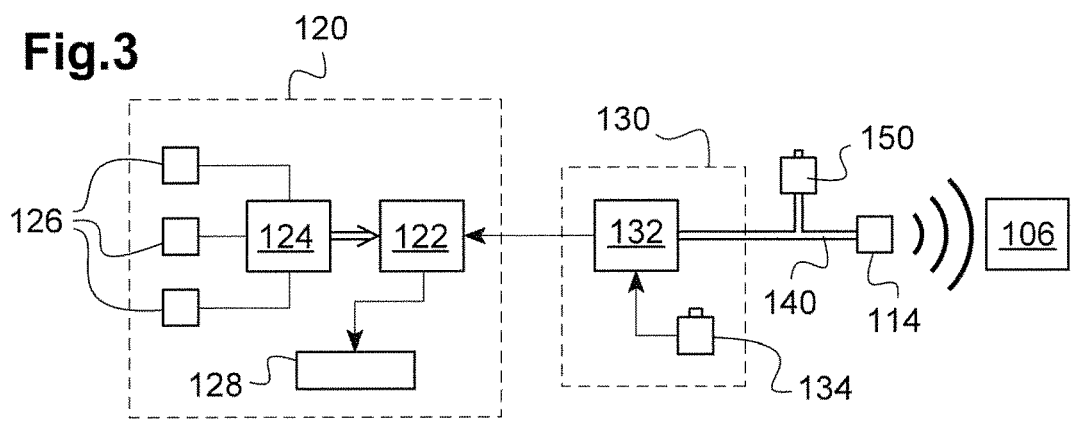
FIG. 3 shows a second embodiment of an onboard system according to the invention.

According to a second embodiment schematically represented in FIG. 3, the vehicle onboard system 10 comprises the automatic parking unit 120, the human machine interface 130, a button 150 and a radio communication circuit 114.

The button 150 and the radio communication circuit 114 are connected via a bus 140. When the user depresses the button 150, an actuation instruction is transmitted on the bus 140. Upon detecting this actuation instruction on the bus 140, the radio communication circuit 114 generates a sub GHz radiofrequency signal (i.e. a radiofrequency signal having a main frequency below 1 GHz) intended to operate the mechanism 106 (and corresponding to the wireless instruction mentioned above).

The mechanism 106 is designed to operate the access system 4 (here to open the garage door) when receiving the radiofrequency signal.

Thus, actuation of the button 150 by the user results in operating the access system 4 of the park area 5.

As in the first embodiment, the human machine interface 130 comprises a control unit 132 and an HMI element 134. The HMI element 134 is here a (push) button, but could be another type of mechanical knob, or a virtual button on a touchscreen, or a voice or gesture command.

The human machine interface 130 (and precisely here the control unit 132) is connected to the bus 140.

Upon actuation of the element 134 of the human machine interface 130 by the user, an actuation signal is received at the control unit 132.

The control unit 132 of the human machine interface 130 then sends the above-mentioned actuation instruction on the bus 140 and commands the automatic parking unit 120 to perform an automatic maneuver into the park area 5 (as further explained below).

Precisely, the control unit 132 of the human machine interface 130 sends a request to a control unit 122 of the automatic parking unit 120 to start the automatic parking procedure. Further operation of the automatic parking unit 120 is described below.

In parallel (i.e. here contemporaneously), the actuation instruction sent by the control unit 132 on the bus 140 is received (detected) by the radio communication circuit 114, commanding it to generate a (here sub GHz) radiofrequency signal intended to the mechanism 106 (in a similar fashion as when button 150 is depressed, as explained above).

Upon receiving the radiofrequency signal (in practice: together with correct credentials), the mechanism 106 operates (here: opens) the access system 4 (here the garage door), which enables the vehicle 8 to maneuver into the park area 5 (under the control of the automatic parking unit 120).

According to a possible implementation, transmission of the radiofrequency signal is synchronized with the maneuver. In this goal, the automatic parking unit 120 may for instance be suited to determine an appropriate time to operate the access system 4 (possibly taking into account the time needed to operate the access system) and to communicate said appropriate time to (the control unit 132 of) the human machine interface 130 such that (the control unit 132 of) the human machine interface 130 may send the actuation instruction on the bus 140 (and thus control operation of the access system 4) at said appropriate time.

Figure 4:
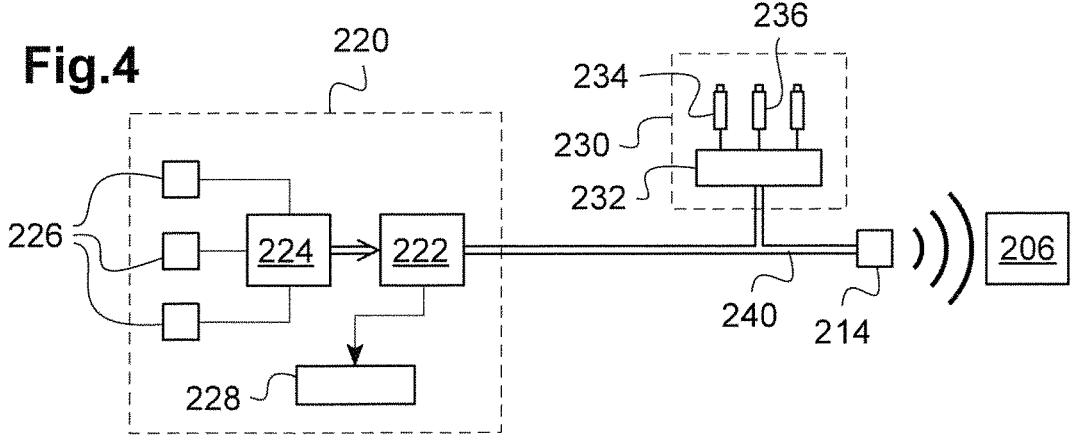
FIG. 4 shows a third embodiment of an onboard system according to the invention.

According to a third embodiment schematically represented in FIG. 4, the vehicle onboard system 10 comprises the automatic parking unit 220, the human machine interface 230 and a radio communication circuit 214.

The human machine interface 230 comprises a control unit 232 and at least an HMI element (such as a button 234), here a plurality of HMI elements, such as for instance said (push) button 234 and at least another (push) button 236.

The human machine interface 230 (and precisely here the control unit 232), the automatic parking unit 220 (here a control unit 222 of the automatic parking unit 220) and the radio communication circuit 214 are interconnected by a bus 240.

When the user depresses the button 234, the control circuit 232 of the human machine interface 230 sends a given instruction on the bus 240. Upon receiving this given instruction on the bus 240, the radio communication circuit 214 generates a sub GHz radiofrequency signal (i.e. a radiofrequency signal having a main frequency below 1 GHz) intended to the mechanism 206 (and corresponding to the wireless instruction mentioned above).

As in the second embodiment, the mechanism 206 is designed to operate (e. g. open) the access system 4 (here to open the garage door) when receiving the radiofrequency signal (in practice: together with correct credentials).

Thus, actuation of the button 234 by the user leads to operating the access system 4 of the park area 5.

In addition, the automatic parking unit 220 (precisely the control unit 222 of the automatic parking unit 220) is suited to receive (or detect) the given instruction on the bus 240 and to trigger an automatic parking maneuver upon detecting the given instruction on the bus 240.

Thus, actuation of the button 234 by the user leads also to starting the automatic parking maneuver.

Operation of the automatic parking unit 20, 120, 220 is now described.

The automatic parking unit 20, 120, 220 comprises at least one sensor 26; 126; 226 (generally a plurality of sensors), a processing circuit 24; 124; 224, a control circuit 22; 122; 222 and at least a vehicle motion control mechanism 28; 128; 228 (such as a power train and/or a steering system and/or a braking system).

Each sensor 26; 126; 226 (for instance a video camera or an ultrasonic sensor) captures data representative of the environment of the vehicle 8.

The processing circuit 24; 124; 224 processes (e.g. analyzes) the (raw) data captured by the sensor(s) 26; 126; 226 to generate processed data, which also incorporates the vehicle environment, but in a more synthetic manner. The processed data contains for instance the location of detected objects in the environment of the vehicle 8.

The control circuit 22; 122; 222 receives these processed data and possibly a command from the human machine interface 30; 130; 230, e.g. a request to start the automatic parking procedure.

When the command received from the human machine interface 30; 130; 230 indicates the automatic maneuver should be started or proceed, the control circuit 22; 122; 222 controls the vehicle motion control mechanism(s) 28; 128; 228 based on the processed data so as to drive the vehicle 8 in its environment.

When the command received from the human machine interface 30; 130; 230 indicates the automatic maneuver should be stopped, the control circuit 22; 122; 222 controls the vehicle motion control mechanism(s) 28; 128; 228 to halt the vehicle 8.

The examples described here involve a vehicle entering into a park area. The invention is however not limited to this situation and also applies in particular to the case of a vehicle maneuvering out of a park area.

The invention claimed is:

1. An onboard automatic parking system for a vehicle comprising:
    an automatic parking unit for controlling a maneuver of the vehicle in or out of a park area secured by a remotely controlled access system, wherein the access system comprises a mechanism for operating the access system;
    a communication circuit for sending a wireless instruction for operating the access system; and
    a human machine interface (HMI), disposed onboard the vehicle, for monitoring the communication circuit to send the wireless instruction upon actuation of the HMI,
    wherein sending the wireless instruction is synchronized with the maneuver of the vehicle,
    wherein the automatic parking unit comprises a sensor, a control circuit, and a processing circuit,
    wherein the HMI commands the automatic parking unit that controls the maneuver subsequent to actuation of said HMI,
    wherein the automatic parking unit computes an appropriate time based on a time needed for the mechanism to operate the access system,
    wherein the automatic parking unit communicates the appropriate time to the HMI such that the HMI controls operation of the access system at the appropriate time,
    wherein the vehicle includes a button for sending a given instruction via a bus to the communication circuit, and
    wherein the button is connected to a first end of the bus, and the communication circuit is connected to a second end of the bus, and
    wherein the first end and the second end are disposed on the vehicle.

2. The onboard automatic parking system according to claim 1, wherein the communication circuit establishes a wireless data link with the mechanism and transmits said wireless instruction via said wireless data link.

3. The onboard automatic parking system according to claim 1, wherein the communication circuit is suited to transmit the wireless instruction by generating a sub GHz radiofrequency signal.

4. The onboard automatic parking system according to claim 3, the communication circuit generating said radiofrequency signal upon receiving the given instruction, and wherein the HMI is connected to said bus and suited to send the given instruction on said bus upon actuation of said HMI.

5. The onboard automatic parking system according to claim 3, wherein said HMI comprises the button suited to send the given instruction via the bus to the communication circuit, the communication circuit generating said radiofrequency signal upon receiving the given instruction, and wherein the automatic parking unit is suited to control the maneuver upon receiving the given instruction on the bus.

6. The onboard automatic parking system according to claim 1, wherein the sensor acquires data relating to the vehicle environment, the processing circuit processes data acquired by the sensor, and the control circuit controls a vehicle motion control mechanism based on the processed data.

7. The onboard automatic parking system according to claim 1, wherein the HMI comprises a control unit and a HMI element, wherein the HMI element is at least one of a push button, a mechanical knob, a virtual button on a touchscreen, a voice command, and a gesture command.

8. The onboard automatic parking system according to claim 7, wherein the control unit of the HMI is connected to the bus.

9. The onboard automatic parking system according to claim 1, wherein the HMI, the automatic parking unit and the radio communication circuit are interconnected by the bus.

* * * * *